US006982395B2

(12) United States Patent
Bayer et al.

(10) Patent No.: US 6,982,395 B2
(45) Date of Patent: Jan. 3, 2006

(54) METHOD AND APPARATUS FOR PLASMA WELDING WITH LOW JET ANGLE DIVERGENCE

(75) Inventors: Erwin Bayer, Dachau (DE); Philip Betz, Maulbronn (DE); Joerg Hoeschele, Meckenbeuren-Brochenzell (DE); Friedrich Oeffinger, Stuttgart (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 44 days.

(21) Appl. No.: 10/471,858

(22) PCT Filed: Mar. 6, 2002

(86) PCT No.: PCT/DE02/00813

§ 371 (c)(1), (2), (4) Date: Feb. 13, 2004

(87) PCT Pub. No.: WO02/076158

PCT Pub. Date: Sep. 26, 2002

(65) Prior Publication Data

US 2004/0149700 A1 Aug. 5, 2004

(30) Foreign Application Priority Data

Mar. 15, 2001 (DE) ........................................ 101 12 494

(51) Int. Cl.
*B23K 10/00* (2006.01)

(52) U.S. Cl. ............................ 219/121.46; 219/121.45; 219/121.51; 219/121.52; 315/111.51

(58) Field of Classification Search ............ 219/121.52, 219/121.36, 121.4, 121.43, 121.41, 121.59, 219/121.48, 121.51, 74.75; 315/111.51; 204/298.37, 204/298.38; 118/723 MW See application file for complete search history.

(56) References Cited

U.S. PATENT DOCUMENTS

| | | | | | |
|---|---|---|---|---|---|
| 4,611,108 | A | | 9/1986 | Leprince et al. | |
| 4,911,805 | A | * | 3/1990 | Ando et al. | 204/164 |
| 5,051,557 | A | * | 9/1991 | Satzger | 219/121.52 |
| 5,083,004 | A | | 1/1992 | Wells et al. | |
| 5,180,435 | A | * | 1/1993 | Markunas et al. | 118/723 IR |
| 5,349,154 | A | | 9/1994 | Harker et al. | |
| 5,414,235 | A | | 5/1995 | Lucas et al. | |
| 5,851,507 | A | * | 12/1998 | Pirzada et al. | 423/659 |
| 5,973,289 | A | | 10/1999 | Read et al. | |
| 2003/0222586 | A1 | * | 12/2003 | Brooks et al. | 315/111.71 |

FOREIGN PATENT DOCUMENTS

| | | |
|---|---|---|
| FR | 2547693 | 12/1984 |
| WO | 00/61284 | 10/2000 |

* cited by examiner

*Primary Examiner*—Mark Paschall
(74) *Attorney, Agent, or Firm*—Crowell & Moring LLP

(57) ABSTRACT

The invention relates to a method and an apparatus for plasma welding. A free microwave-induced plasma jet is generated by the following steps. Microwaves are generated in a high-frequency microwave source. The microwaves are guided in a wave guide. A process gas is introduced at a pressure of p≧1 bar into a microwave-transparent tube, which comprises a gas inlet opening and a gas outlet opening, the process gas being introduced through the gas inlet opening into the microwave-transparent tube in such a way that it has a tangential flow component. A plasma is generated in the microwave-transparent tube by electrodeless ignition of the process gas. The plasma jet is produced by the introduction of the plasma into a working space through a metallic expansion nozzle arranged at the gas outlet opening of the tube.

14 Claims, 3 Drawing Sheets

METHOD AND APPARATUS FOR PLASMA WELDING WITH LOW JET ANGLE DIVERGENCE

BACKGROUND AND SUMMARY OF THE INVENTION

This application claims the priority of International Application No. PCT/DE02/00813, filed Mar. 6, 2002, and German Patent Document No. 101 12 494.5, filed Mar. 15, 2001, the disclosures of which are expressly incorporated by reference herein.

The present invention relates to a method and an apparatus for plasma welding.

In recent years, many efforts have been made precisely in order to further increase and develop the performance capability of conventional plasma welding processes, for example tungsten inert gas (TIG) welding or metal active gas (MAG) welding.

In the case of TIG welding, an electric arc discharges between a non-melting tungsten electrode and the workpiece, by which means the workpiece is melted. The electric arc has a divergence angle of approximately 45°. This means that the distance between the TIG torch and the workpiece significantly influences the power density which is, overall, relatively small. Because of the high thermal conductivity of the metals, a substantial proportion of the heat flows into the surroundings of the weld seam. In the case of a current strength limited by the life of the electrode and, therefore, also of limited electric arc power, relatively low welding rates result.

In the case of various plasma welding processes, the plasma jet can be constricted by means of water-cooled expansion nozzles, by which means a reduction in the (visual) electric arc divergence to approximately 10° can be effected. In the case of the technically usual distances between plasma torch and workpiece, therefore, a higher power density and, as a result, a higher welding rate is achieved at identical electric arc power. Due to the more stable and, relative to the conventional TIG welding process, less divergent plasma jet, a smaller influence of the welding parameters on the shape of the electric arc is additionally achieved.

If, in the case of appropriate electrode arrangement, distinctly more energy is supplied to the electric arc by increasing the current strength, the so-called button-hole effect appears. At appropriate thickness, the workpiece is melted eye-shaped and, in the case of continuous advance of the plasma torch, the melted metal flows around the plasma jet and back together behind it.

A disadvantageous effect of the process described is that the possible current strength is limited by the life of the electrodes and, therefore, the welding rate is also limited. The result of this is a high thermal loading of the component, extensive heat affected zones and, in addition, a substantial distortion of the workpiece.

The technical possibilities for increasing the welding rate further have been substantially exhausted. In addition to the resulting economic consequences, this has the additional effect that it will be impossible, in the future, to achieve results substantially below the current boundaries for energy per unit length, distortion and the deterioration in properties due to the relatively extensive heat affected zone. This is, in addition, particularly disadvantageous in that the property potential of modern, high-strength materials, whose properties can only be achieved by means of specific heat treatments, cannot by a wide margin be utilized due to the current state of development of the conventional welding processes.

A further disadvantage of the conventional plasma welding processes consists in the limited accessibility and limited possibility of observing the welding location. This is due to a relatively large nozzle diameter at a small workpiece distance (approximately 5 mm).

The object of the invention is to provide a process of plasma welding in which the disadvantages of the prior art are avoided.

According to the invention, a free microwave-induced plasma jet is used for the plasma welding. This is generated as follows: microwaves, which are guided in a wave guide, are generated in a high-frequency microwave source. The process gas is introduced at a pressure of $p \geqq 1$ bar into a microwave-transparent tube, which comprises a gas inlet opening and a gas outlet opening, through the gas inlet opening of the tube in such a way that it has a tangential flow component. A plasma is generated by means of electrodeless ignition of the process gas in the microwave-transparent tube, which plasma is introduced into the working space through a metallic expansion nozzle arranged at the gas outlet opening of the tube, by which means the plasma jet is generated.

Particularly advantageous plasma properties are produced by means of the electrodeless plasma welding process according to the invention. As an example, the specific enthalpy of the plasma and the associated plasma enthalpy flux density are increased. In association with this, the temperature of the plasma and the plasma jet is increased. Advantages with respect to an increased welding rate and lower weld seam costs, relative to the welding processes of the prior art, arise from this. The plasma welding process according to the invention therefore provides an electrodeless welding process that offers substantial economic and use advantages with a simultaneously large breadth of application of the welding process.

In addition, the properties of the plasma jet are improved in terms of a reduced diameter and a reduced jet angle divergence. In addition, the cylindrically symmetrical plasma jet propagates, in the process according to the invention, in a parallel fashion so that the influence of the change in distance between torch and workpiece on the shape of the penetration of the plasma jet into the workpiece is reduced. A further advantage is that by this means, the accessibility to the plasma jet—introduced by a larger possible distance between torch and workpiece—is improved. With the process according to the invention, distances between torch and workpiece of between 30 mm and 100 mm are therefore possible at a plasma jet diameter on the workpiece of between 1 mm and 3 mm. Power densities above $1.5\ 10^5$ W/cm$^2$ can therefore be generated with the plasma welding process according to the invention.

The tangential feed of the process gas into the microwave-transparent tube supports the generation, according to the invention, of a plasma jet with low jet angle divergence. Because of the radial acceleration caused by the tangential feed of the process gas, which radial acceleration is further reinforced by the cross-sectional contraction of the expansion nozzle in the direction of the nozzle outlet, the non-uniformly accelerated free charge carriers move in the direction of the expansion nozzle outlet on continually narrowing spiral tracks, by which means the centripetal acceleration of the charge carriers increases. This motion is also retained by the charge carriers after emergence from the expansion nozzle into the working space. Because, due to the different ion and electron mobilities, no charge neutrality is present locally, an axially oriented magnetic field is induced in the plasma jet, which field leads to a flow constriction of the plasma jet after emergence from the nozzle (z pinch). The magneto-hydrodynamic effect (MHD effect) is involved in this process.

A further advantage of the method according to the invention is that the plasma jet can be generated by means of low-cost and robust high-frequency systems, for example magnetron or klystron. With these high-frequency systems, advantageous microwave sources are accessible in the necessary power range up to 100 kW and in the frequency range between 0.95 GHz and 35 GHz. In particular, microwaves of frequency 2.46 GHz can be used because, in this case, microwave sources are involved which are of low cost and are widespread in industry and domestic applications.

In the plasma welding process according to the invention, furthermore, the energy efficiency is increased relative to conventional plasma welding processes. As an example, it is possible to generate microwave-induced plasmas in which the coupling of power from the radiation field of the microwave sources is greater than 90%. In consequence, an increased energy efficiency by 1.5 times arises relative to welding processes with high-performance diodes and by 20 times relative to laser welding processes.

The coupling of the high-frequency energy of the microwave source into the relevant process gases, as necessary for the plasma generation, then depends on the electromagnetic material constants of the relevant process gases, in particular on the complex dielectric constant $\epsilon$:

$$\epsilon=\epsilon'-i\epsilon'' \quad (1)$$

The complex dielectric constant is a non-linear function of the temperature and a linear function of the frequency. The relationship between imaginary part and real part of the complex dielectric constant is designated as the dielectric loss angle $\phi$ and defines an absorption probability of the process medium for high-frequency energy:

$$\tan\phi=\epsilon''/\epsilon' \quad (2)$$

The volume-specific absorption of high-frequency energy by a fundamentally high-frequency absorbing medium (a suitable process gas in the present case) is given as follows:

$$P_{abs}=\pi v\,\epsilon'' E^2 \quad (3)$$

v is the frequency of the absorbed high-frequency radiation with the electrical field strength E in the absorbing volume. Provided the absorption losses of the high-frequency radiation in the absorbing volume can be mainly defined by means of the (frequency-dependent) electrical conductivity $\sigma$ in $(\Omega m)^{-1}$, magnetic effects being negligible, the following applies:

$$\epsilon''=\sigma/2\pi v \quad (4)$$

The total loss power density which can be converted in an electrically absorbing medium in the case of entering high-frequency radiation is therefore given by:

$$P_{abs}=\tfrac{1}{2}\sigma E^2 \quad (5)$$

In the case of plasma generation by high-frequency radiation in gases, it is necessary to differentiate between the ignition procedure-low electrical conductivity—and the procedure for maintaining a plasma—electrical conductivity of typical plasma gases higher than that of the corresponding non-ionized gases by at least three orders of value. Both in the case of the plasma ignition and during operation of the plasma, a high local electrical field strength E is generally helpful because of the dependence of the convertible loss power density on the absolute square of the local electrical field strength E.

Because of the electrodeless plasma generation, there is no limitation with respect to the process gases which can be employed in the process according to the invention. The process according to the invention therefore solves the problem of the prior art that, in the case of electrode-induced plasmas, reactions occur between the process gases employed and the electrode materials with, for example, the formation of tungsten oxide or tungsten nitride in the case of tungsten electrodes or the occurrence of hydrogen embrittlement. By the selection of appropriate gases or gas mixtures suitable for the process, it is therefore possible to increase the specific enthalpy of the plasma in association with an improved heat conduction between plasma and workpiece. In an advantageous embodiment of the invention, it is possible for powder to be supplied to the process gas before entry into the microwave-transparent tube. By this means, it is for example possible to employ the process according to the invention as a powder build-up welding process. It is, of course, also possible to supply the powder to the plasma jet after emergence from the expansion nozzle.

Because of the electrodeless plasma welding, the entry of unwanted electrode material into the weld material is also prevented. In addition, a disturbance-free, unmanned and automated welding process is possible without continuous replacement of wear parts.

A further advantage of the plasma welding process according to the invention is that the heat affected zone on the workpiece due to the plasma jet is substantially reduced, which results in a lower heat input, reduced workpiece distortion and a reduction in the damage to the material. In addition, a low-fault welding with respect to smaller edge notches and less porosity of the weld seam is made possible by means of the plasma welding process according to the invention.

In an advantageous embodiment of the invention, the process gas is introduced into the microwave-transparent tube through a nozzle in such a way that the process gas flowing into the tube has a tangential flow component and has an axial flow component directed in the direction of the gas outlet opening.

In a further advantageous embodiment of the invention, viewed in the flow direction of the plasma, the metallic expansion nozzle has a convergent inlet on the plasma side and a free or divergent outlet on the plasma jet side. By this means, it is possible to improve the properties of the plasma jet with respect to the reduction in the jet angle divergence. Furthermore, the jet diameter can be limited by means of the opening cross section of the expansion nozzle. Because of the high plasma temperatures, the metallic expansion nozzle can, in an advantageous embodiment of the invention, be cooled.

In order to ensure reliable operation and reliable ignition of the plasmas necessary for the process according to the invention, the wave guide present for the guidance of the microwaves is, in an advantageous embodiment of the invention, restricted in cross section. The wave guide is then preferably restricted at the location at which the microwave-transparent tube is guided through the wave guide. In an expedient embodiment of the invention, the wave guide and the tube are then directed at right angles to one another. The advantage is an increase in the electrical field strength at the location of the cross-sectional restriction. By this means, the ignition properties of the process gas are improved, on the one hand, and the power density of the plasma is increased, on the other.

In a further advantageous embodiment of the invention, it is also possible to employ a spark gap for igniting the plasma.

BRIEF DESCRIPTION OF THE DRAWINGS

The invention is explained in more detail below using the drawings. In these.

DETAILED DESCRIPTION OF THE DRAWINGS

Microwave-induced thermal plasmas are, in particular, generated by means of the process according to the invention. These plasmas are characterized by a local thermodynamic equilibrium (LTE) between the various enthalpy contributions from the plasma. The total enthalpy of the plasma is then determined, depending on the molecular nature of the process gases, by the following contributions:

- enthalpy from the degrees of freedom in translation, rotation and vibration;
- enthalpy from dissociation;
- enthalpy from ionization.

By means of the statistical thermodynamics, the temperature-dependent total enthalpy H(T) and the temperature-dependent thermal capacity $C_p(T)$, which can be determined from this by a first derivation with respect to temperature, can be calculated. The respective molecular degrees of freedom have then to be taken into account in the condition totals for the translation, rotation and vibration. The corresponding condition totals can then be calculated, in the presence of dissociation and ionization, from the respective equilibrium constants (not performed in any more detail).

Figure 1:
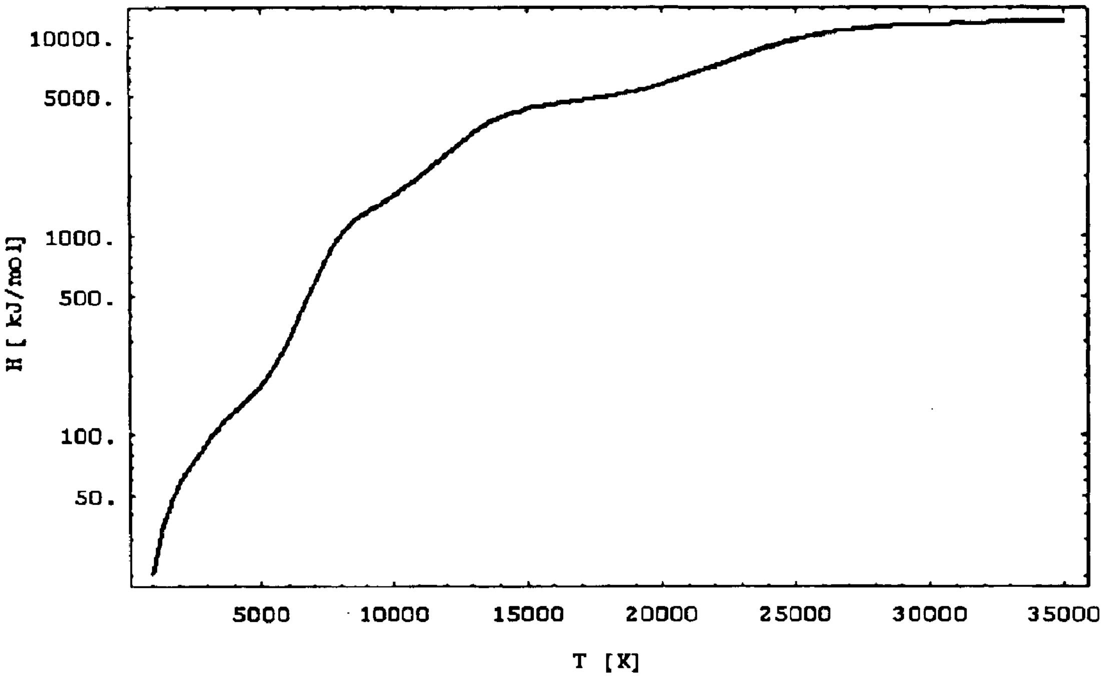
FIG. 1 shows the temperature-dependent enthalpy of a nitrogen plasma calculated by means of statistical thermodynamics.

The calculated temperature-dependent enthalpy of nitrogen plasma, which was generated by means of the process steps according to the invention, is represented in FIG. 1. The diagram shows a very steep positive slope of the enthalpy up to a temperature of 20,000 K (logarithmic representation on the ordinate).

Figure 2:
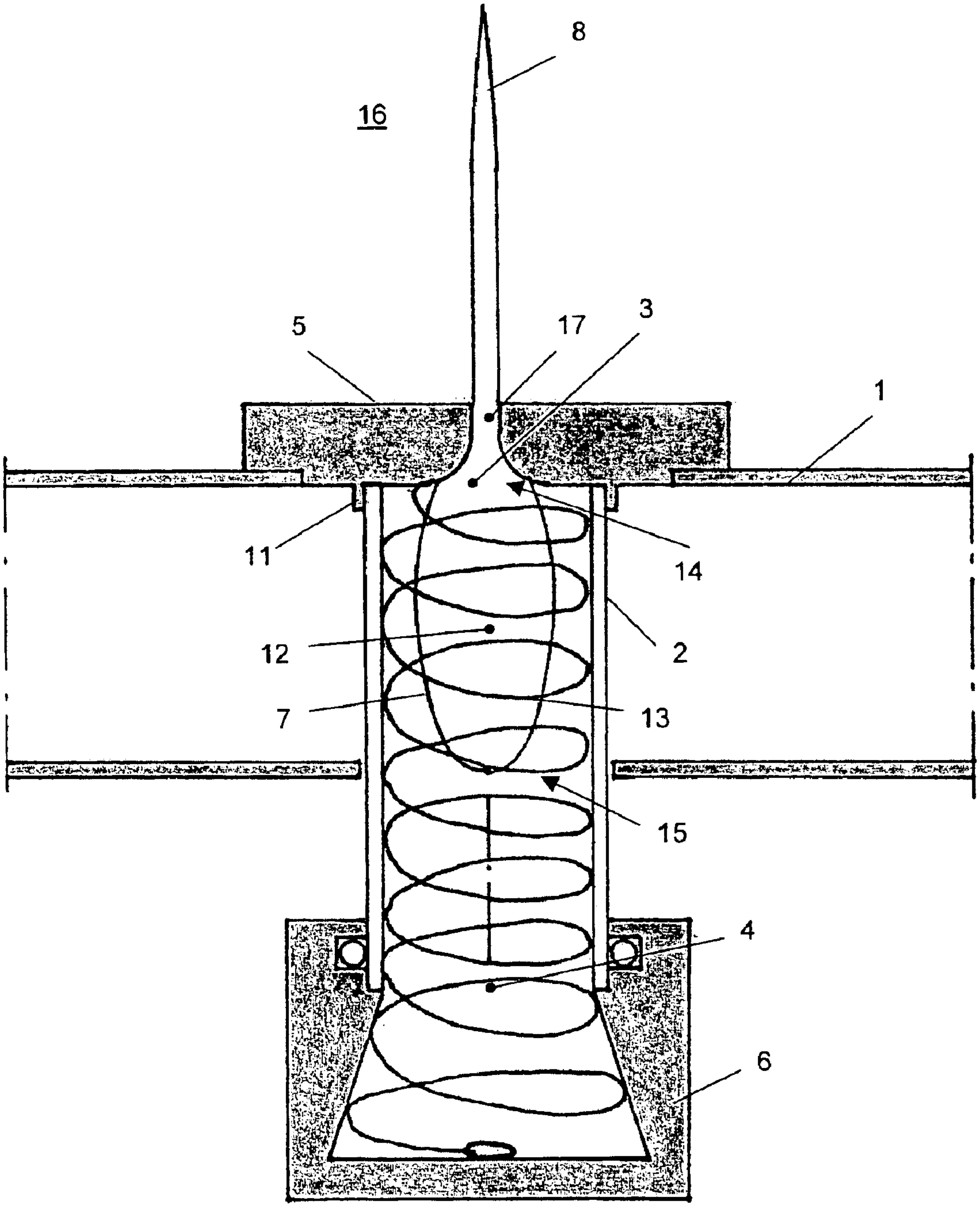
FIG. 2 shows, in sectional representation, an appliance for carrying out the process according to the invention with wave guide, expansion nozzle, microwave-transparent tube and a supply unit for the process gas.

FIG. 2 shows, in sectional representation, an appliance for carrying out the process according to the invention. The representation shows a microwave-transparent tube 2, which is guided at right angles through a wave guide 1, which transports the microwaves generated by a microwave source (not shown). The microwave-transparent tube 2 is guided through an opening 14 located at the top of the wave guide 1 and through an opening 15 located at the bottom of the wave guide 1.

The microwave-transparent tube 2 has a gas inlet opening 4 for the process gas and a gas outlet opening 3 for the plasma 7. In the region 12, in which the microwave-transparent tube 2 extends through the wave guide 1, the plasma 7 is generated by microwave absorption.

A gas supply unit 6 is connected to the gas inlet opening 4 on the microwave-transparent tube 2 by means, for example, of a crimp connection in order to avoid destruction of the microwave-transparent tube. Nozzles (not shown), through which the process gas is fed into the microwave-transparent tube 2, are present in the gas supply unit 6. In this configuration, the nozzles are arranged in such a way that the entering process gas has a tangential flow component and has an axial flow component directed in the direction of the gas outlet opening 3. The process gas is, in particular, guided on spiral tracks within the microwave-transparent tube. This causes a strong centripetal acceleration of the gas in the direction of the inner surface of the microwave-transparent tube 2 and causes the formation of a depression along the tube axis. This depression, furthermore, also facilitates the ignition of the plasma.

The plasma can be ignited by a spark gap (not shown), for example an arc discharge or an ignition spark. In the case of optimum matching of the wave guide system, i.e. maximum field strength of the microwave at the location of the tube axis, an autonomous plasma ignition is also possible.

A metallic expansion nozzle 5 is fastened at the gas outlet opening 3 of the microwave-transparent tube 2. In this configuration, the expansion nozzle 5 is arranged in such a way that the opening 14 of the wave guide 1 is closed. In order to fix the microwave-transparent tube 2, a groove or a web 11 is machined into the lower surface of the expansion nozzle 5. In this configuration, the web 11 only protrudes a few millimetres into the wave guide space, which prevents a disturbance to the microwave field within the wave guide 1.

On its lower surface, i.e. on the surface facing toward the plasma 7, the expansion nozzle 5 has a convergent inlet. Due to this restriction, the charge carriers in the plasma 7 are further accelerated as far as the outlet opening 17. The plasma 7 then enters, as a plasma jet 8, into the working space 16 through the outlet opening 17. In the present representation, the outlet of the expansion nozzle 5 is represented as a free outlet. A divergent outlet is, however, also possible.

The centripetal acceleration of the charge carriers in the plasma 7 is continued in the free plasma jet 8 after emergence through the expansion nozzle 5. Because of the centripetal acceleration of the charge carriers in the plasma jet 8, an axial magnetic field is induced in the plasma jet 8, as described in the descriptive introduction, by which means the constriction of the flow is also continued beyond the outlet opening 17 of the expansion nozzle 5. A plasma jet 8 with a small jet angle divergence is therefore generated.

Figure 3:
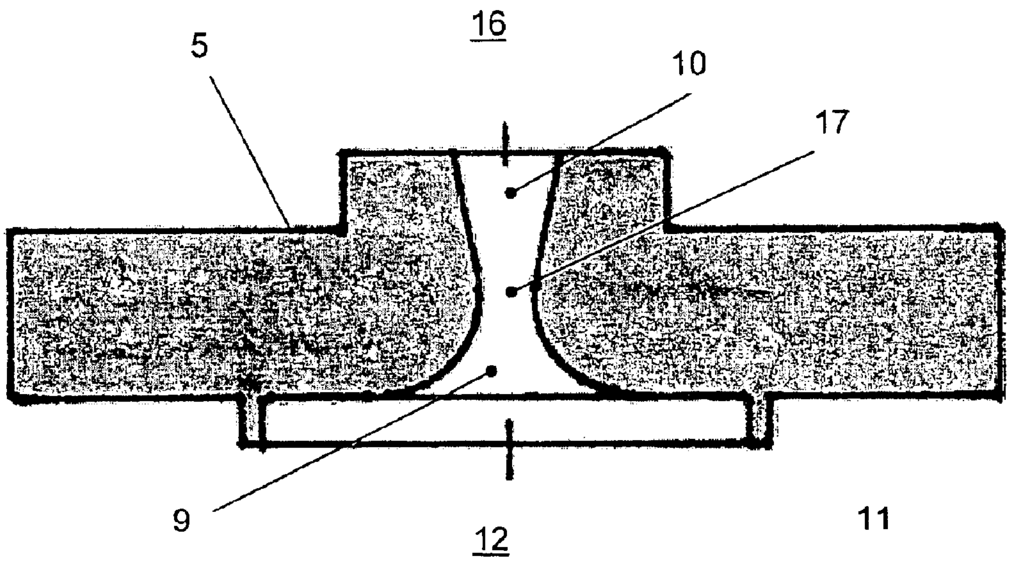
FIG. 3 shows an exemplary expansion nozzle in sectional representation.

FIG. 3 shows, in sectional representation, an exemplary expansion nozzle. A web 11 for fixing the microwave-transparent tube (not shown) is machined onto the lower surface of the expansion nozzle 5. The web 11 has, in particular, a circular configuration and has an inner radius which corresponds to the outer radius of the microwave-transparent tube.

The inlet region 9 of the expansion nozzle 5 has a convergent configuration, which leads to an increase in the flow velocity of the charge carriers of the plasma as far as the outlet opening 17. The outlet region 10 of the expansion nozzle 5 has a divergent configuration.

In the case of appropriate pressure relationships between the pressure in the working space 16 and the pressure on the inside 12 of the microwave-transparent tube, in the case of appropriate size of the outlet opening 17 and in the case of an appropriate configuration of the inlet region 9 and the outlet region 10 of the expansion nozzle 5, it is possible to maintain a plasma jet (not shown) which expands into the working space 16 with supersonic velocity.

Figure 4:
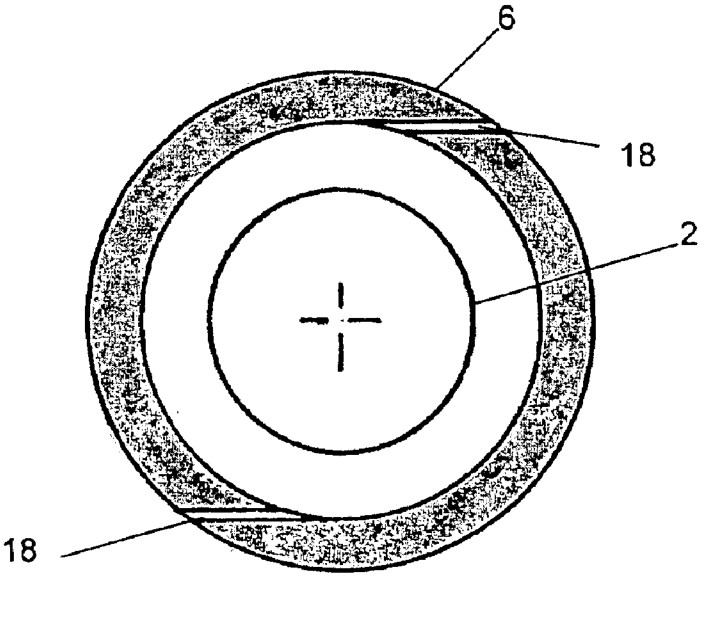
FIG. 4 shows, in plan view, a supply unit for the process gas.

FIG. 4 represents, in plan view, a gas supply unit 6 for supplying the process gas to the microwave-transparent tube 2. Two nozzles 18, which feed the process gas into the microwave-transparent tube 2 in two opposite directions, are embodied in the gas supply unit 6. By this means, a tangential feed of the process gas is achieved.

What is claimed is:

1. A method for plasma welding, comprising the steps of:

generating microwaves in a high frequency microwave source;

guiding the microwaves in a wave guide;

introducing a process gas at a pressure of $p \geqq 1$ bar into a microwave-transparent tube which includes a gas inlet opening and a gas outlet opening, wherein the process gas is introduced through the gas inlet opening such that the process gas has a spiral flow through the microwave-transparent tube;

generating a plasma in the microwave-transparent tube by electrodeless ignition of the process gas; and generating a plasma jet by introducing the plasma into a working space through a metallic expansion nozzle arranged at the gas outlet opening of the microwave-transparent tube.

2. The method for plasma welding according to claim 1, wherein the process gas is introduced into the microwave-transparent tube via a nozzle.

3. The method for plasma welding according to claim 1, wherein the metallic expansion nozzle has a convergent inlet on a plasma side and one of a free and a divergent outlet on a plasma jet side.

4. The method for plasma welding according to claim 1, further comprising the step of cooling the metallic expansion nozzle.

5. The method for plasma welding according to claim 1, wherein the microwaves are generated in a frequency range between 0.95 GHz and 35 GHz.

6. The method for plasma welding according to claim 1, wherein the wave guide is disposed at a right angle to the microwave-transparent tube and wherein the wave guide is restricted in cross-section at a location where the microwave-transparent tube is guided through the wave guide.

7. The method for plasma welding according to claim 1, wherein the microwave-transparent tube has dielectric properties and is comprised of $SiO_2$ or $A1_2O_3$ in pure form without dotations.

8. The method for plasma welding according to claim 1, further comprising the step of igniting the plasma with a spark gap.

9. The method for plasma welding according to claim 1, further comprising the step of adding powder to the process gas before introducing the process gas into the microwave-transparent tube.

10. The method for plasma welding according to claim 1, wherein the process gas is guided on spiral tracks within the microwave-transparent tube.

11. An apparatus for plasma welding, comprising:

a high frequency microwave source for generating microwaves;

a wave guide, wherein the microwaves are guided within the wave guide;

a microwave-transparent tube disposed within the wave guide and having a gas inlet opening and a gas outlet opening;

a gas supply unit, wherein the gas supply unit supplies a process gas into the microwave-transparent tube through the gas inlet opening and wherein the process gas has a spiral flow through the microwave-transparent tube; and an expansion nozzle arranged at the gas outlet opening of the microwave-transparent tube;

wherein a plasma is generated in the microwave-transparent tube by electrodeless ignition of the process gas and wherein a plasma jet is generated by introducing the plasma into a working space through the expansion nozzle.

12. The apparatus of claim 11, wherein the expansion nozzle has a convergent inlet on a plasma side and a divergent outlet on a plasma jet side.

13. The apparatus of claim 11, wherein the wave guide is disposed at a right angle to the microwave-transparent tube.

14. The apparatus of claim 11, wherein the process gas is guided on spiral tracks within the microwave-transparent tube.

* * * * *